(12) United States Patent
Goss

(10) Patent No.: US 8,857,780 B1
(45) Date of Patent: Oct. 14, 2014

(54) HANGING FACILITATION ASSEMBLY

(71) Applicant: Nathaniel D. Goss, Menomonie, WI (US)

(72) Inventor: Nathaniel D. Goss, Menomonie, WI (US)

(*) Notice: Subject to any disclaimer, the term of this patent is extended or adjusted under 35 U.S.C. 154(b) by 0 days.

(21) Appl. No.: 13/828,403

(22) Filed: Mar. 14, 2013

(51) Int. Cl.
*F16M 13/00* (2006.01)
*A47G 1/16* (2006.01)
*A47G 1/20* (2006.01)
*F16M 13/02* (2006.01)

(52) U.S. Cl.
CPC .............. *F16M 13/02* (2013.01); *A47G 1/1606* (2013.01); *A47G 1/20* (2013.01)
USPC .......................................... 248/547; 248/479

(58) Field of Classification Search
CPC ....... A47G 1/20; A47G 1/162; A47G 1/1606; A47G 1/205; A47G 25/746
USPC .......... 248/216.1, 217.1, 217.2, 217.3, 217.4, 248/479, 544, 546, 547
See application file for complete search history.

(56) References Cited

U.S. PATENT DOCUMENTS

| | | | |
|---|---|---|---|
| 126,256 A * | 4/1872 | Bowerman ................. | 248/216.1 |
| 812,386 A * | 2/1906 | Walden ..................... | 248/216.4 |
| 930,399 A * | 8/1909 | Manser ...................... | 248/216.1 |
| 3,146,981 A | 9/1964 | Wheeler | |
| 3,294,356 A | 12/1966 | Sherman | |
| 3,298,651 A * | 1/1967 | Passer ....................... | 248/217.2 |
| 3,995,820 A * | 12/1976 | Einhorn ..................... | 248/216.1 |
| 4,342,439 A * | 8/1982 | Bruner ......................... | 248/544 |
| D266,223 S | 9/1982 | Swartz | |
| 5,018,697 A | 5/1991 | Treanor et al. | |
| 5,454,542 A | 10/1995 | Hart | |
| 7,497,028 B2 | 3/2009 | Nevers et al. | |
| 7,708,252 B2 * | 5/2010 | Vander Berg et al. ........ | 248/544 |

* cited by examiner

*Primary Examiner* — Gwendolyn W. Baxter

(57) ABSTRACT

A hanging facilitation assembly provides a frame for hanging an object on a wall surface constructed from drywall with minimal damage. The assembly includes a substantially planar frame having an upper edge, a front face, and a back face. A plurality of apertures extends through the frame between the front face and the back face. Each of the apertures extends downwardly through the frame from the front face towards the back face. Each of a plurality of straight connectors is insertable through an associated one of the apertures wherein the frame is configured to be attached to a vertical support surface by the connectors. A base member is pivotally coupled to a bottom edge of the frame. A projection extends from a back surface of the base member for insertion into the vertical support surface when the base member is pivoted into a coplanar position relative to the frame.

10 Claims, 5 Drawing Sheets

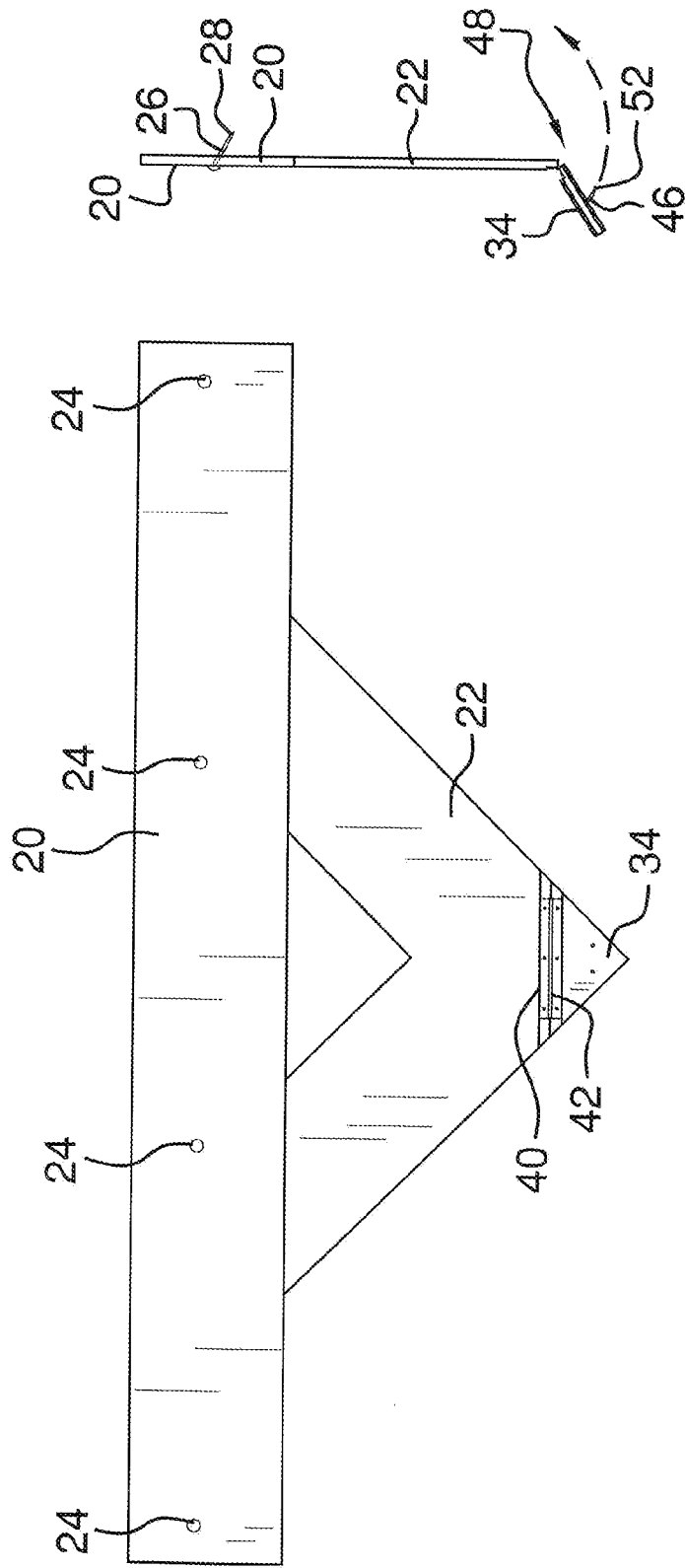

HANGING FACILITATION ASSEMBLY

BACKGROUND OF THE DISCLOSURE

Field of the Disclosure

The disclosure relates to hanging facilitation devices and more particularly pertains to a new hanging facilitation device for facilitating hanging an object on a wall surface constructed from drywall.

SUMMARY OF THE DISCLOSURE

An embodiment of the disclosure meets the needs presented above by generally comprising a substantially planar frame having an upper edge, a front face, and a back face. A plurality of apertures extends through the frame between the front face and the back face. Each of the apertures extends downwardly through the frame from the front face towards the back face. Each of a plurality of straight connectors is insertable through an associated one of the apertures wherein the frame is configured to be attached to a vertical support surface by the connectors. A base member is pivotally coupled to a bottom edge of the frame. A projection extends from a back surface of the base member for insertion into the vertical support surface when the base member is pivoted into a coplanar position relative to the frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a front view of an embodiment of the disclosure.
FIG. 3 is a side view of an embodiment of the disclosure.

DESCRIPTION OF THE PREFERRED EMBODIMENT

Figure 1:
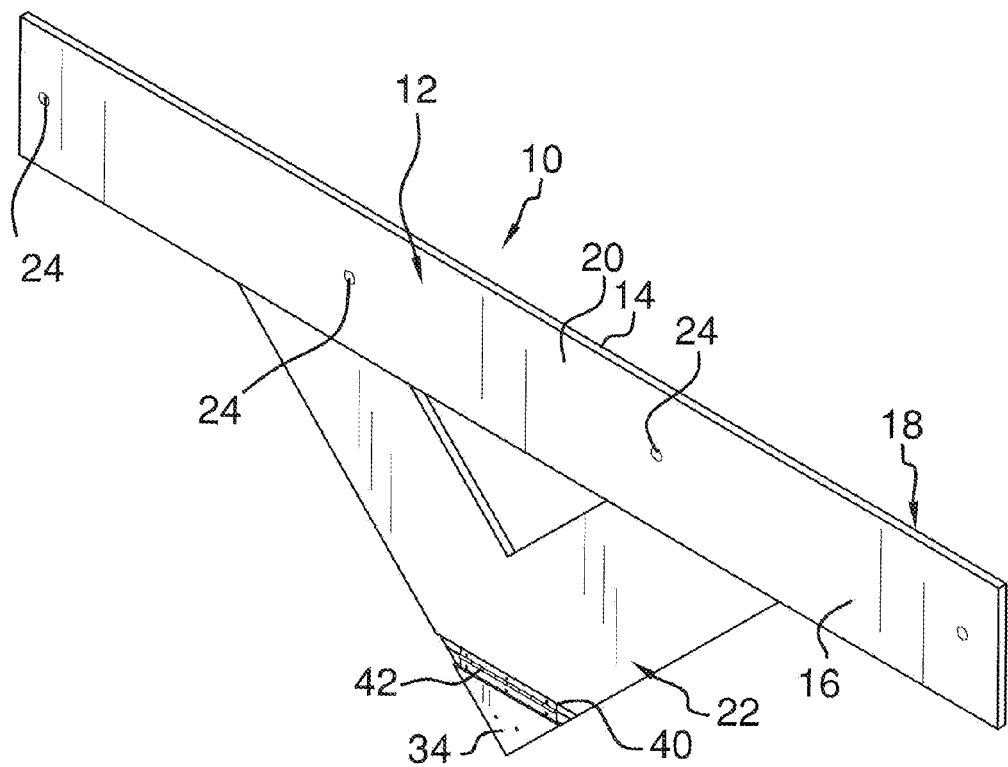
FIG. 1 is a top front side perspective view of a hanging facilitation assembly according to an embodiment of the disclosure.
Figure 4:
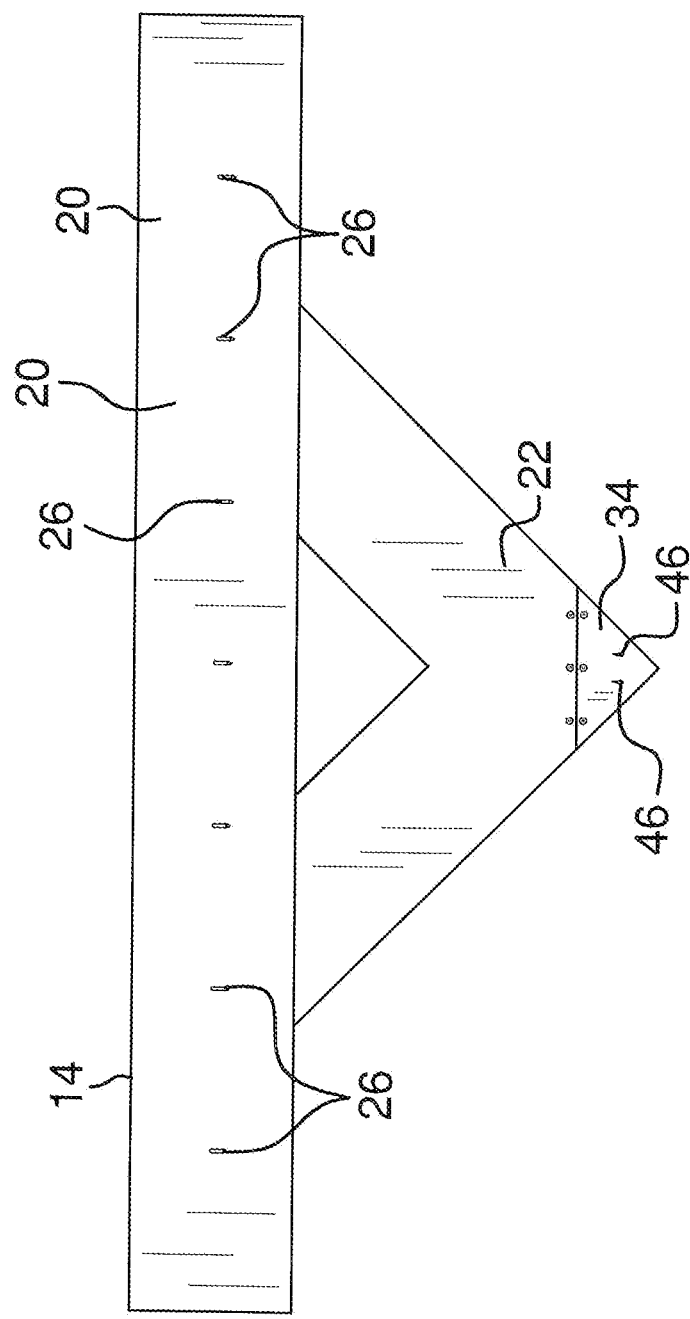
FIG. 4 is a back view of an embodiment of the disclosure.
Figure 5:
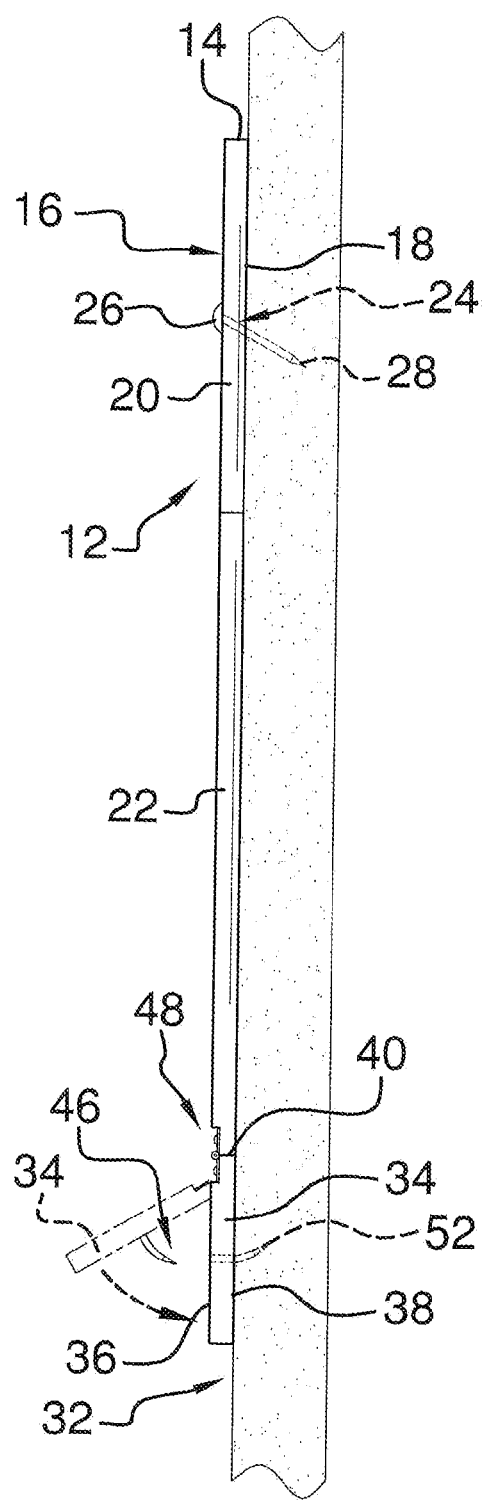
FIG. 5 is a side view of an embodiment of the disclosure in use.
Figure 6:
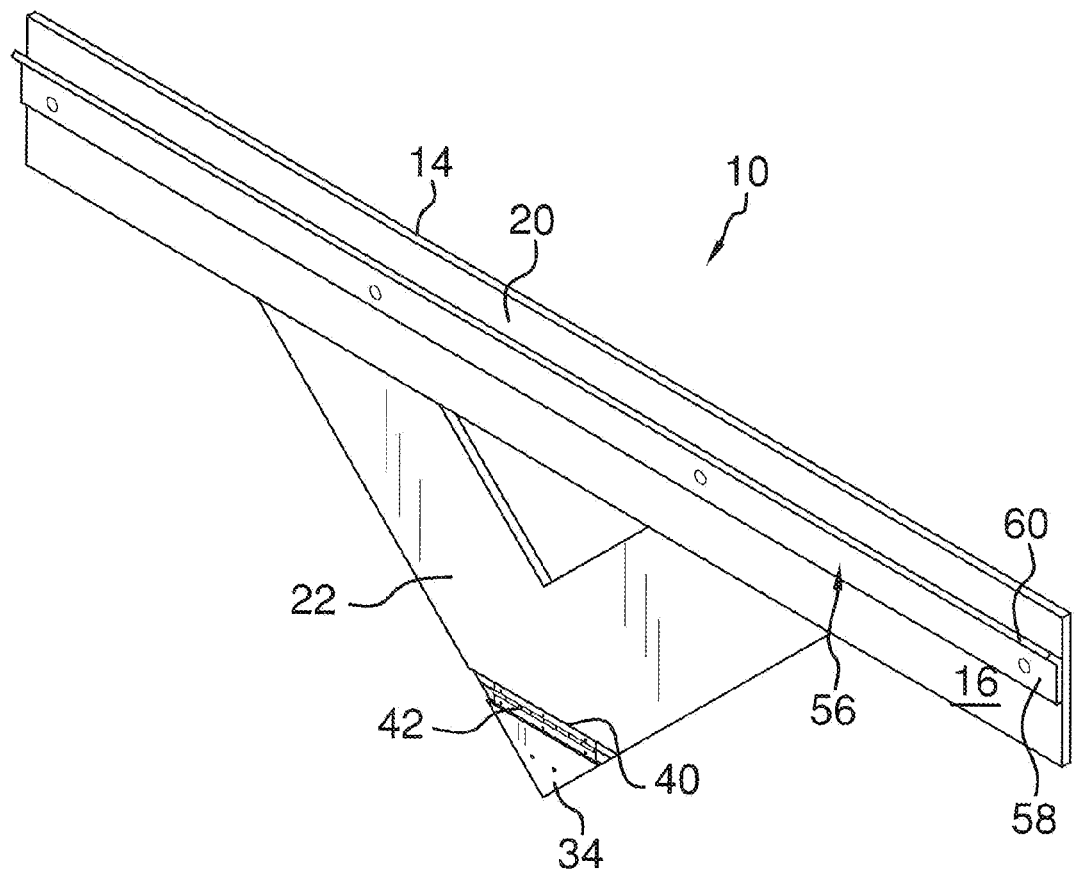
FIG. 6 is a top front side perspective view of an embodiment of the disclosure.

With reference now to the drawings, and in particular to FIGS. 1 through 6 thereof, a new hanging facilitation device embodying the principles and concepts of an embodiment of the disclosure and generally designated by the reference numeral 10 will be described.

As best illustrated in FIGS. 1 through 6, the hanging facilitation assembly 10 generally comprises a substantially planar frame 12 having an upper edge 14, a front face 16, and a back face 18. The upper edge 14 of the frame 12 is straight. The frame 12 has an elongated upper section 20 and at least one lower section 22 extending downwardly away from the upper section 20. A plurality of apertures 24 extend through the frame 12 between the front face 16 and the back face 18. Each of the apertures 24 extends downwardly at an angle between twenty and forty degrees from vertical as the aperture 24 extends through the frame 12 from the front face 16 towards the back face 18. Thus, each aperture 24 is angled relative to the front face 16 and the back face 18. Each aperture 24 may be equidistant from the upper edge 14 of the frame 12 wherein the apertures 24 are aligned extending across the frame 12. A plurality of straight connectors 26 is provided. Each connector 26 is inserted through an associated one of the apertures 24 and has a pointed end 28 extending from the back face 18 of the frame when the connector 26 is fully inserted into the aperture 24. Thus, the frame 12 is configured to be attached to a vertical support surface 32 by the connectors 26. Using the plurality of connectors 26 spaced evenly across the frame 12 distributes weight supported by the frame 12 allowing for relatively small connectors 26 to be used to support relatively heavy objects coupled to the frame 12. The distribution of weight and relative small size of the connectors 26 facilitates coupling the frame 12 to the support surface 32 with minimal structural damage to the support surface 32. Thus, the assembly 10 facilitates supporting heavy objects coupled to the frame 12 even when the support surface 32 is constructed from a relatively brittle material such as conventional drywall.

A base member 34 has a front surface 36 and a back surface 38. The base member 34 is pivotally coupled to a bottom edge 40 of the frame 12. The back surface 38 of the base member 34 is coplanar with the back face 18 of the frame 12 when the base member 34 is vertically aligned with the frame 12. Similarly, the front surface 36 of the base member 34 is coplanar with the front face 16 of the frame 12 when the base member 34 is vertically aligned with the frame 12. An elongated hinge 42 may be used and oriented parallel to the upper edge 14 of the frame 12. The hinge 42 may be inset relative to the front face 16 of the frame 12 and back surface 36 of the base member 34. At least one projection 46 extends from the back surface 38 of the base member 34. The projection 46 is configured for insertion into the vertical support surface 32 when the base member 34 is pivoted into a coplanar position relative to the frame 12. The projection 46 may be curved extending away from the back surface 38 of the base member 34 and the projection 46 may extend along a curved line equidistant from a pivot point 48 of the base member 34 as the base member 34 pivots relative to the frame 12. The curvature facilitates insertion of the projection 46 smoothly into the vertical support surface 32 as the base member 34 is pivoted. The curvature of the projection 46 further works with the downward angling of the connectors 26 to inhibit disengagement of the frame 12 from the support surface 32 due to weight supported by the frame 12. A distal end 52 of the projection 46 relative to the base member 34 may be pointed to further facilitate insertion of the projection 46 in to the support surface 32.

A bracket 56 may be coupled to the front face 16 of the frame 12 top facilitate coupling an object to the frame 12. The bracket 56 may have a first flange 58 coupled to the front face 16 of the frame 12 and a second flange 60 extending simultaneously away from the front face 16 of the frame 12 and towards the upper edge 14 of the frame 12. The bracket 56 may be oriented parallel to the upper edge 14 of the frame to facilitate supporting objects in a level position relative to said frame 12.

In use, the frame 12 is coupled to the support surface 32 using connectors 26 inserted through apertures 24 at a downward angle. The base member 34 is then pivoted to engage the projection 46 into the support surface 32 providing additional support to the frame 12 and further inhibiting disengagement of the frame 12 from the support surface 32. An object may then be coupled to the frame 12 wherein the object is supported on the support surface 32.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A hanging facilitation assembly comprising:
a substantially planar frame having an upper edge, a front face, and a back face;
a bracket coupled to said front face of said frame, said bracket having a first flange coupled to said front face of said frame, said bracket having a second flange extending simultaneously away from said front face of said frame and towards said upper edge of said frame;
a plurality of apertures extending through said frame between said front face and said back face, each of said apertures extending downwardly as said aperture extends through said frame from said front face towards said back face wherein each said aperture is angled relative to said front face and said back face;
a plurality of straight connectors, each connector being insertable through an associated one of said apertures wherein said frame is configured to be attached to a vertical support surface by said connectors;
a base member pivotally coupled to a bottom edge of said frame; and
a projection extending from a back surface of said base member, said projection being configured for insertion into the vertical support surface when said base member is pivoted into a coplanar position relative to said frame.

2. The assembly of claim 1, further comprising said projection being curved extending away from said back surface of said base member.

3. The assembly of claim 2, further comprising said projection extending along a curved line equidistant from a pivot point of said base member as said base member pivots relative to said frame.

4. The assembly of claim 1, further comprising a distal end of said projection relative to said base member being pointed.

5. The assembly of claim 1, further comprising said back surface of said base member being coplanar with said back face of said frame when said base member is vertically aligned with said frame.

6. The assembly of claim 5, further comprising a front surface of said base member being coplanar with said front face of said frame when said base member is vertically aligned with said frame.

7. The assembly of claim 1, further comprising each said aperture being equidistant from said upper edge of said frame.

8. The assembly of claim 7, further comprising said upper edge of said frame being straight wherein said apertures are aligned extending across said frame.

9. The assembly of claim 1, further comprising said frame having an elongated upper section and a lower section extending downwardly away from said upper section.

10. A hanging facilitation assembly comprising:
a substantially planar frame having an upper edge, a front face, and a back face, said upper edge of said frame being straight, said frame having an elongated upper section and a lower section extending downwardly away from said upper section;
a bracket coupled to said front face of said frame, said bracket having a first flange coupled to said front face of said frame, said bracket having a second flange extending simultaneously away from said front face of said frame and towards said upper edge of said frame;
a plurality of apertures extending through said frame between said front face and said back face, each of said apertures extending downwardly as said aperture extends through said frame from said front face towards said back face wherein each said aperture is angled relative to said front face and said back face, each said aperture being equidistant from said upper edge of said frame wherein said apertures are aligned extending across said frame;
a plurality of straight connectors, each connector being insertable through an associated one of said apertures wherein said frame is configured to be attached to a vertical support surface by said connectors;
a base member having a front surface and a back surface, said base member being pivotally coupled to a bottom edge of said frame, said back surface of said base member being coplanar with said back face of said frame when said base member is vertically aligned with said frame, said front surface of said base member being coplanar with said front face of said frame when said base member is vertically aligned with said frame; and
a projection extending from a back surface of said base member, said projection being configured for insertion into the vertical support surface when said base member is pivoted into a coplanar position relative to said frame, said projection being curved extending away from said back surface of said base member, said projection extending along a curved line equidistant from a pivot point of said base member as said base member pivots relative to said frame, a distal end of said projection relative to said base member being pointed.

* * * * *